(12) United States Patent
Ross et al.

(10) Patent No.: US 10,238,994 B2
(45) Date of Patent: Mar. 26, 2019

(54) DILUENT TREATED DRILLING WASTE MATERIAL RECOVERY PROCESS AND SYSTEM

(71) Applicant: RECOVER ENERGY SERVICES INC., Calgary (CA)

(72) Inventors: Stan Ross, Cochrane (CA); Wendell Palmer, Cochrane (CA)

(73) Assignee: RECOVER ENERGY SERVICES INC., Calgary, Alberta (CA)

( * ) Notice: Subject to any disclaimer, the term of this patent is extended or adjusted under 35 U.S.C. 154(b) by 0 days.

(21) Appl. No.: 15/801,750

(22) Filed: Nov. 2, 2017

(65) Prior Publication Data

US 2018/0193775 A1   Jul. 12, 2018

Related U.S. Application Data

(60) Provisional application No. 62/416,952, filed on Nov. 3, 2016.

(51) Int. Cl.
 *B01D 21/26* (2006.01)
 *E21B 21/06* (2006.01)
 *B01D 53/72* (2006.01)
 *B01D 29/90* (2006.01)
 *B01D 21/28* (2006.01)

(52) U.S. Cl.
 CPC ......... *B01D 21/262* (2013.01); *B01D 29/906* (2013.01); *B01D 53/72* (2013.01); *E21B 21/065* (2013.01); *E21B 21/068* (2013.01); *B01D 21/283* (2013.01)

(58) Field of Classification Search
 None
 See application file for complete search history.

(56) References Cited

U.S. PATENT DOCUMENTS

| | | | | |
|---|---|---|---|---|
| 4,139,462 | A | * | 2/1979 | Sample, Jr. ............ B01D 19/00 134/19 |
| 4,836,302 | A | * | 6/1989 | Heilhecker .......... B01D 11/028 175/66 |
| 5,005,655 | A | * | 4/1991 | Stokke .................. B09B 3/0091 134/10 |
| 5,053,082 | A | * | 10/1991 | Flanigan ............ B01D 11/0223 134/25.1 |
| 5,080,721 | A | * | 1/1992 | Flanigan .............. B01D 11/028 134/2 |
| 5,090,498 | A | | 2/1992 | Hamill |
| 8,287,441 | B2 | | 10/2012 | Wick |
| 8,668,634 | B2 | | 3/2014 | Wick |
| 8,820,438 | B2 | | 9/2014 | Ross et al. |

(Continued)

*Primary Examiner* — Anuradha Ahuja
(74) *Attorney, Agent, or Firm* — Greenblum & Bernstein, P.L.C.

(57) ABSTRACT

A process and apparatus for removing hydrocarbons from hydrocarbon containing drilling waste. The process includes introducing hydrocarbon contaminated drill cuttings into one or more centripetal cuttings separators to create two distinct phases, thereafter discarding the bulk solids containing less hydrocarbons and treating the concentrated liquids phase in a solvent wash apparatus, resulting in improved efficiency of the facility throughput, while not substantially impacting the capital cost or operating cost of a solvent wash process facility. Apparatus for performing the process is also described.

36 Claims, 6 Drawing Sheets

(56) References Cited

U.S. PATENT DOCUMENTS

| | | | |
|---|---|---|---|
| 2002/0074269 A1* | 6/2002 | Hensley | E21B 21/065 |
| | | | 209/726 |
| 2008/0210466 A1* | 9/2008 | McDonald | E21B 21/066 |
| | | | 175/5 |
| 2011/0036785 A1* | 2/2011 | Martin | E21B 21/065 |
| | | | 210/770 |
| 2014/0158431 A1* | 6/2014 | Anderson | E21B 41/005 |
| | | | 175/57 |
| 2014/0371113 A1* | 12/2014 | Fout | E21B 21/066 |
| | | | 507/117 |

* cited by examiner

212
Unstabilized drill cuttings

213
Sawdust (or stabilizing material)

214
Stabilized drill cuttings

DILUENT TREATED DRILLING WASTE MATERIAL RECOVERY PROCESS AND SYSTEM

CROSS-REFERENCE TO RELATED APPLICATION

The present application claims the benefit under 35 U.S.C. § 119(e) of U.S. provisional application Ser. No. 62/416,952 filed on Nov. 3, 2016, the disclosure of which is hereby expressly incorporated by reference in its entirety.

TECHNICAL FIELD

The field of art to which this invention generally pertains is the processing of drilling waste.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies such as thermal extraction, solvent washes, and alternate mechanical separators, and the increasing cost of drilling fluids, the ability to, and benefits of, reclaiming materials from the drilling waste, such as various components of the drilling fluids, is increasing.

Accordingly, there is a constant search for new technologies and improvements to existing technologies to increase the efficiency and effectiveness of reclaiming processes.

BRIEF SUMMARY

A process for treating unstabilized drill cuttings is described including separating a first phase of unstabilized drill cuttings into a second phase of drill cuttings containing less liquid than the first phase and a concentrated third liquid phase containing approximately equal volumes of low micron solids and oil base mud, where the second phase comprises self-stabilized drill cuttings requiring the additional of no stabilization material prior to disposition and, the concentrated third liquid phase comprises a concentrated mixture of oil based drilling mud containing high and low gravity solids. Subsequently the rheology of the concentrated third liquid phase is altered by flowing the concentrated third liquid phase concentrated mixture of oil based drilling mud containing high and low gravity solids through a gas tight solvent wash process to remove the oil based drilling mud from the concentrated third liquids phase. The initial separation stage allows the subsequent solvent wash stage to treat only the concentrated third liquids phase, and not the second phase of drill cuttings containing less liquid than the first phase, resulting in increased overall throughput of unstabilized drill cuttings through the process without an increase in overall power consumption or capital investment.

Additional embodiments include: the process described above where the process produces a consistent second phase of drill cuttings containing less liquid than the first phase; the process described above where the separating is with a Verti-G centripetal cuttings separator; the process described above where the vertical cuttings separator is operated at greater than 300 gravitational forces; the process described above where the vertical cuttings separator is operated at greater than 400 gravitational forces; the process described above where the separating is produced by a big bowl oilfield decanter specifically adapted for treating oil base mud drill cuttings; the process described above where the big bowl oilfield decanter is operated at greater than 1000 gravitational forces; the process described above where the concentrated third liquid phase is held in a gas tight feed hopper for further processing; the process described above where the first phase of unstabilized drill cuttings originates from more than one waste generator, and the waste from greater than a single waste generator is comingled prior to processing; the process described above where the solvent wash has an upper section and a lower section and the concentrated third liquid phase is introduced into the lower section of the solvent wash using positive pressure to facilitate the low micron solids overcoming gravitational forces in the wash to become fully dispersed in the oil based mud and solvent mixture; the process described above where the concentrated third liquid phase is conveyed to the solvent wash process so as to maintain a solvent to oil based mud ratio within the solvent wash process to produce a liquids phase yield point of less than 1 Pa; the process described above 10 where the concentrated third liquid phase is flowed through the solvent wash at a rate so as to maintain a solvent to oil based mud ratio within the solvent to produce a plastic viscosity of less than 5 cP; the process described above where the solvent wash contains at least one diluent having a flashpoint less than or equal to 37° C.; the process described above where the mixture of concentrated third liquid phase and concentrated mixture of oil based drilling mud containing high and low gravity solids and solvent in the solvent wash has a flashpoint less than or equal to 37° C.; the process described above where an additional solids phase is produced in the solvent wash which is removed from the solvent wash and conveyed to a solids dryer for residual solvent removal resulting from the solvent wash; the process described above where the solvent wash contains at least one diluent having a vapor pressure equal to or greater than 0.1 Torr and less than 750 Torr, at 20° C.; the process described above where the gas tight solvent wash contains less than the minimum oxygen content required for ignition of the solvent; the process described above where the gas tight solvent wash additionally contains an inert gas; the process described above where the inert gas comprises one or more of nitrogen, carbon dioxide, and/or fuel gas; the process described above where the inert gas exerts a positive pressure in the process; and the process described above where the process consumes less than 200 kW's of electric or equivalent energy per cubic meter of unstabilized drill cuttings treated.

Apparatus for treating unstabilized drill cuttings is also described including a separator for separating a first phase of unstabilized drill cuttings into a second phase of drill cuttings containing less liquid than the first phase and a concentrated third liquid phase containing approximately equal volumes of low micron solids and oil base mud, where the second phase comprises self-stabilized drill cuttings requiring the addition of no stabilization material prior to disposition and, the concentrated third liquid phase comprises a concentrated mixture of oil based drilling mud containing high and low gravity solids and, a gas tight solvent wash tank in fluid flow communication with the separator for altering the rheology of the concentrated third liquid phase by flowing the concentrated third liquid phase concentrated mixture of oil based drilling mud containing high and low gravity solids through the gas tight solvent wash tank to remove the oil based drilling mud from the concentrated third liquids phase, resulting in increased overall throughput of unstabilized drill cuttings through the apparatus without an increase in overall power consumption or capital investment.

Additional embodiments include: the apparatus described above where the apparatus produces a consistent second phase of drill cuttings containing less liquid than the first phase; the apparatus described above where the separator is a Verti-G centripetal cuttings separator; the apparatus described above where the vertical cuttings separator can operate at greater than 300 gravitational forces; the apparatus described above where the vertical cuttings separator is operated at greater than 500 gravitational forces; the apparatus described above where the separator is a big bowl oilfield decanter specifically adapted for processing unstabilized oil base mud drill cuttings; the apparatus described above where the big bowl oilfield decanter can operate at greater than 1000 gravitational forces; the apparatus described above including a gas tight feed hopper in fluid flow communication with the separator for further processing the concentrated third liquid phase; the apparatus described above where the solvent wash tank has an upper section and a lower section and the concentrated third liquid phase can be introduced into the lower section of the solvent wash using positive pressure to facilitate the low micron solids overcoming gravitational forces in the wash to become fully dispersed in the oil based mud and solvent mixture; the apparatus described above including a conveyor and solids dryer in fluid flow communication with the solvent wash tank where an additional solids phase can be separated in the solvent wash tank which can be removed from the solvent wash tank and conveyed to the solids dryer for residual solvent removal resulting from the solvent wash; the apparatus described above where the solvent wash tank can contain at least one diluent having a vapor pressure equal to or greater than 0.1 Torr and less than 750 Torr, at 20° C.; the apparatus described above where the gas tight solvent wash tank is designed to contain less than the minimum oxygen content required for ignition of the solvent; the apparatus described above where the gas tight solvent wash tank is designed to additionally contain an inert gas; the apparatus described above where the inert gas exerts a positive pressure in the apparatus; and the apparatus described above where the apparatus consumes less than 200 kW's of electric or equivalent energy per cubic meter of unstabilized drill cuttings treated.

DETAILED DESCRIPTION

Figure 1:
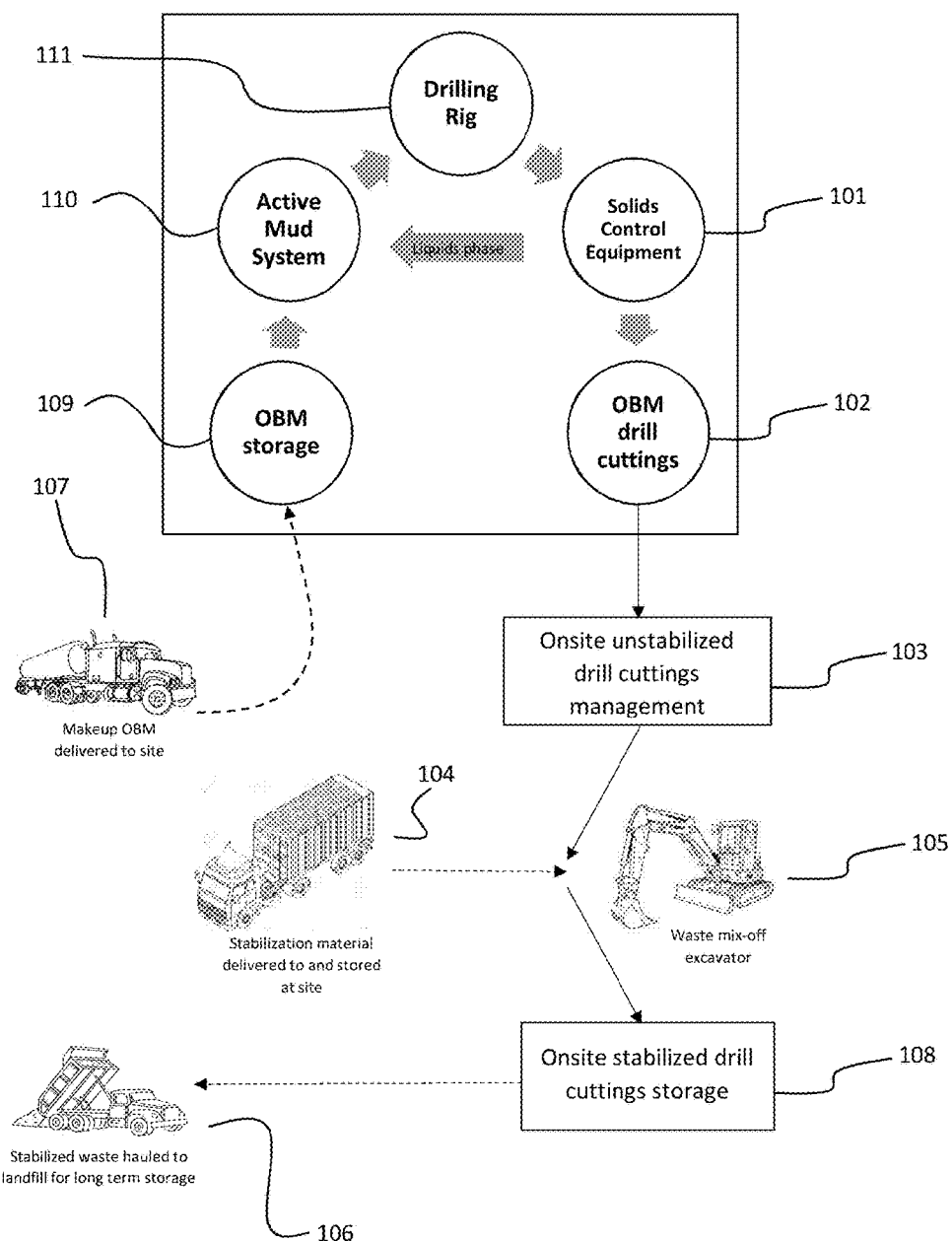
FIG. 1 demonstrates a typical on site drilling rig fluids and solids management operation.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Apparatus and methods of combining the use of mechanical separation and solvent washing to increase the overall efficiency of oil based drilling fluid recovered from the unstabilized drill cuttings are described herein. This is accomplished by pre-drying the unstabilized drill cuttings using a centripetal cuttings separator to mechanically separate the two phases, prior to employing a solvent wash process, the entire process being capable of a higher overall unstabilized drill cuttings throughput.

The following terminology is included for ease of understanding of the reader:

Drilling fluid is used in the drilling industry to carry the drill cuttings/solids phase (rock, clay, shale, etc.) broken up by the drill bit out of the well bore. Drilling fluid (also known as drilling mud) consists of a base fluid with additives which can include liquids or solids or both, which give the drilling fluid properties necessary for effective use as a drilling mud.

Oil based mud (OBM) is also known as Invert, is a type of drilling fluid that uses oil as the base ingredient and typically consists of a mixture of oil, emulsified water and drilling mud additives which might be solids or liquids or both. OBM's typically consist of distillates or synthetic oil as the base fluid. Conversely, water based mud is a drilling fluid that uses water as the base ingredient, mixed with liquids or solids or both. Common types of water base muds are floc-water mud systems, brine mud systems or polymer mud systems.

Low micron solids are generally known as solids that are less than fifty microns in size. Low micron solids can include high or low gravity solids, which are typically (albeit arbitrarily) separated by a specific gravity (SG) of 3.0 in the drilling industry. For example, high gravity solids are weighting agents like barite or hematite, both of which are heavier than 3.0 SG. Drilled solids and drilling fluid additives, for example, bentonite, lime, or lignite are lighter than 3.0 SG.

Viscosity is used to describe the thickness of a fluid, and the magnitude of associated frictional effects between fluid molecules. For example, water is not very viscous whereas a milkshake is typically very viscous.

Rheology is used with reference to the study of Newtonian and non-Newtonian fluid behavior. One facet of a fluids rheology is its "Yield Point," or carrying capacity. A marble dropped in a bottle of water will demonstrate a fluid with a very low yield, because the marble drops without stirring the water. The same marble dropped in a bottle ketchup will not drop through the fluid without a significant amount of stirring or agitation.

For purposes of general understanding herein, the Metric system has been used for consistent units of measurement, unless specifically cited as another, except for measurements in "Torr", which is not specific to either the Imperial or Metric systems. Torr measurements cited within this document are gauge pressure.

OBM's are typically comprised of a mixture of additives which can be either fluids or solids, collectively forming a useable drilling fluid. OBM's are used by gas or oil well operators when special fluid characteristics are required including, better cooling/carrying capacity, or better wellbore stability, and/or lubricity for the drill string in horizontal wellbores, which are becoming more common. With the significant cost of drilling muds, there has been research and development to most effectively recover as much of the drilling mud as possible, by using solids separating devices or fluids rehabilitation devices. Such systems include shale shakers, centrifuges, centripetal cuttings separators, thermal extraction systems or diluent washing systems.

Typically, the drill cuttings are carried up the wellbore by the drilling mud and passed over a shale shaker(s) to remove a substantial portion of the drilling mud. Shale shakers are considered the first line of defense on a drilling rig, for recapturing drilling fluid that would otherwise be lost to the drill cuttings. They are a highly effective mechanism for bulk liquids recovery and very inexpensive when compared to other conventional forms of solids control, like that of centrifuges for example. While all shale shakers operate on the same basic principal, they come in a variety of models, which offer differing gravitational forces, coarse to very fine screen sizes, differing vibratory motions, and as few as one screen, or as many as four, on one or more screen bed elevations.

Shale shakers apply force, usually measured in terms of gravitational forces, ranging between four to eight times greater than earth's gravity. The principals behind a vibratory screen is to create a bed where the solids and liquids phase "bounce", causing the liquids phase to yield under the stresses of the gravity induced by shaker forces. The yield point is the point where the Bingham Plastic liquids phase transitions from behaving like a solid, to acting as a liquid. Acting as a liquid provides an opportunity for the liquids phase to be thrown from the solids phase, and drop through the low micron screen of the vibratory bed. The liquids phase can then be returned directly to a processing tank, or be collected in an attached hopper or hose, and redirected to another process such as that of centrifuges, hydro cyclones, or membranes, for further fluids rehabilitation. Additional fluids rehabilitation is required because conventional shale shakers are a good mechanism to remove a substantial amount of liquids from the solids. However, this fluid typically contains low micron/low gravity solids that would otherwise travel through the porosity of the vibratory screen, rather than be caught on the upper side of the screen with the larger solids.

Horizontal decanter centrifuges are commonly used to remove the low micron solids that otherwise pass through the shale shaker screens. A typical drill site decanter can exert gravitational forces in excess of 1000 times that of Earth's gravity, and as much as 3000 times Earth's gravity force. These forces are capable of removing substantial volumes of low gravity solids, also known as drilled solids, before the low micron/low gravity solids volume can accumulate and become problematic to the drilling operation. Decanters have many designs and operating parameters including shorter or longer beach lengths for example, or shallow or deeper weir settings to facilitate longer fluids retention or a drier solids discharge. It is up to the designers and operators of the decanter to balance the horizontal decanter parameters against the specific needs of the drill site.

As illustrated in FIG. 1, drill cuttings (102) (from the shale shaker or other solids control equipment (101)) and low gravity solids underflow (as shown also contained in 101) (from the onsite decanter) are typically collected at the drill site in an onsite unstabilized drill cuttings management systems (103) (such as a three or four sided bins) and mixed with a stabilizing agent, for example sawdust or liquids absorbing pellets, which is delivered to the site (104), to absorb the free leachable fluids. The mix off is typically done by means of a wheeled loader or track excavator (105). The stabilized drill cuttings waste can then be transported safely using conventional transport methods, such as sealed end dump trailers. The stabilized drill cuttings waste is stored (108) and transported (106) to specially designed landfills featuring leachate collection systems and impervious liners. Landfills are built for long term storage. Makeup base oil or OBM is transported (107) to the site to cover the OBM losses resulting from the mix off process. The OBM is stored at the site (109) for use in the active mud system (110) of the drilling rig (111).

Figure 2:
FIG. 2 shows examples of unstabilized drill cuttings, stabilizing (or bulking) agent, and stabilized drill cuttings (e.g., ready for storage in a landfill) respectively.

From left to right, FIG. 2 is offered to demonstrate the OBM contaminated drill cuttings waste in a natural state (212), post treatment of a drilling rig shale shaker. The range of wetness in OBM drill cuttings (post shale shaker treatment) can range from as little as 20% by volume (about 10% by weight) to 50% by volume (about 25% by weight). The container shown in the center (213) contains sawdust, commonly used as stabilizing (or bulking) agent, and the container on the right (214) contains the stabilized drill cuttings (ready for storage in a landfill).

Efforts to recover OBM drilling fluid from drill cuttings waste are continually being researched in an effort to find a process that balances clean drill cuttings waste with a processing cost less than or equal to the cost of the OBM drilling fluid. The quality of the recovered OBM (or base oil) is also an important consideration, if not critical to re-marketing efforts.

In recent years, efforts have been made to better facilitate recovery of OBM from drill cuttings. One example is offered in U.S. Pat. No. 5,090,498 which describes an onsite process wherein water or oil is used as a wash medium to wash the oil contaminated drill cuttings in a series of washing tanks. As the solids phase separates in the wash tanks, a pump conveys the slurry from each wash tank to a centrifuge for maximum liquids phase removal. The "cleaned" drill cuttings are then moved to a low temperature thermal processor which operates at a temperature setting of less than 200° C., in accordance with offshore drilling regulations. The process itself is complex and not well suited for tight shale drilling of the 21$^{st}$ century. Tight shale's are essentially compacted clays and by drilling the shale and transporting it up the wellbore, while removing the pressure of the earth causes substantial particle degradation. Essentially the clays have a seemingly infinite surface area, making separation of hydrocarbons and low gravity solids in a wash medium uneconomical, due to the particle settling velocity. Such is further exacerbated by the presence of water as the wash medium. Clays are often hydrophilic and the presence of water as the wash medium causes the clays to swell through the absorption of more water, decreasing the bulk density of the solids phase.

U.S. Pat. No. 4,139,462 describes an onsite hybrid process where as the oil contaminated drill cuttings waste is passed over a conventional rig shale shaker, the drill cuttings are subjected to a low pressure diesel wash process to remove excess oil base mud from the drill cuttings. The rig shale shaker is effectively equipped with a low-tech spray bar to facilitate a wash process as the drill cuttings travel over the vibratory screen deck. A centripetal solids separation process could also be used to further reduce the volume of liquids on the drill cuttings, prior to a thermal process being employed to remove the residual hydrocarbons still remaining on the drill cuttings. The thermal process must be performed within an inert atmosphere because of the possibility of fire or explosion. While the embodiment is likely to achieve high, if not complete separation of the hydrocarbons from the drill cuttings waste, the process is very inefficient when compared to more modern Low Temperature Thermal processors and does not reflect modern health and safety standards. For example, the use of diesel fuel as a drilling fluid has been banned by some regulatory bodies, due to volatiles that are often present in diesel fuel. The use of a diesel spray bar would cause additional volatiles to become airborne around the shale shaker area, due to the vibratory action of the screen deck which is in an area frequented by workers and likely to cause a significant health or safety risk. The embodiment is also impractical because to centrifuge drilling mud at an ambient temperature of 25° C., the viscosity of a recovered oil base liquids phase would be at or near 2.5 centistokes, which is not sufficiently low enough to achieve a significant liquids phase reduction from the solids phase. Thus, the thermal process would still be required to remove most of the liquids phase. U.S. Pat. No. 4,139,462 is inadvertently demonstrating that a multifaceted approach to treating drilling waste contaminated with hydrocarbons could be required for an effective treatment solution.

Another example of an oil recovery process is called an Oil Recovery Unit (ORU) and described in U.S. Pat. Nos. 8,287,441 and 8,668,634. These patents detail a process where unstabilized OBM drill cuttings are collected from a conventional shale shaker and conveyed into a horizontal decanter centrifuge. Specifically, an auger delivers the "wet" drill cuttings into the horizontal decanter that is designed to accept heavy, (greater than 50%) solids laden material. The material spills from the auger delivery system and falls into the big bowl decanter which is spinning at such a rate that the drill cuttings are subjected to substantial centripetal forces, for example, 1,000 to 2,000 g-forces. This force causes the heavier solids to settle along the inner wall of the bowl while the liquids phase leaches into the pond section of the horizontal decanter. The solids phase is conveyed to the conical end where it moves up the beach of the centrifuge and is ejected from the bowl section via wear resistant ports. The technology is at least partially effective at removing free liquids on drill cuttings waste, generally achieving a residual liquids of 20% to 50% (by volume), and as low as 10% residual liquids (by volume). The liquids phase flows in the opposite direction from which the solids are conveyed, and is collected at the opposite end of the bowl where the liquids phase spills over the weirs of the bowl section. This method of separating the liquids phase and solids phase is unique in that the bowl allows for both a significant removal of the OBM drilling fluid from the drill cuttings and could also achieve a simultaneous reduction of low gravity solids from the liquids phase, which can be as little as approximately 5% solids (by volume).

While the Oil Recovery Unit is capable of reclaiming more oil base mud than conventional shale shakers alone, it has several drawbacks including:
1) The equipment described is very expensive and require one or more onsite operators be present to monitor the equipment when in operation. Given that a drilling rig typically only uses OBM for two weeks of a typical four week well, means that the technology can only be utilized for 50% of the time, while sitting idle the other 50% of the time.
2) For the equipment described to function at its greatest potential, additional heat energy is required, to alter the viscosity of the liquids phase, which is contaminating the drill cuttings. Ideally, the process should maintain a minimum feed temperature of approximately 50° C., which means additional power must be used for the process to function at its greatest potential. Given drilling rigs are always operating in remote areas and otherwise do not have access to grid electricity, diesel powered generators must typically be used to supply the required electric energy. To quantify the significance of the heat energy input, one must consider the fact that it takes 1837 BTU's to raise the temperature of 1 m$^3$ (cubic meter) of unstabilized drill cuttings containing 30% hydrocarbons (by volume) and 5% water (by volume), by 1° C. this presumes there is no loss of heat energy due to inefficiencies in the design.
3) As mentioned, the technology can reclaim more oil base mud than conventional shale shakers, but the drill cuttings still contain residual liquids of approximately 20% to 50% (by volume), and as low as 10% residual liquids (by volume). Given the residual contamination is still high enough to emit a distinct odor of hydrocarbons, and the residual contamination is still visually obvious, the marketability of such a technology as "environmentally advantageous" is extremely limited.
4) Issues also exist relating to gearbox sizing. Generally, decanter centrifuges are designed to process a slurry with a solids phase of less than 20% (by volume). Dewatering a heavy solids phase is limited by torque in the gear box and subsequently, the technology described in U.S. Pat. Nos. 8,287,441 and 8,668,634 is unable to keep up with fast hole drilling where greater than five cubic meters of oil based drilling mud contaminated drill cuttings are generated each hour.

Generally speaking, to operate an ORU with the desired outcome of a drier solids phase, would be to the detriment of the liquids phase because operating the ORU with such a process metric would cause more LGS's to be carried with the recovered liquids phase.

Verti-G's are similar in operating principal to the ORU, but exert gravitational forces from a vertical axis rather than a horizontal axis. Like the ORU, Verti-G's generally achieve a residual liquids content of 20% to 50% (by volume), and as low as 10% residual liquids (by volume). Verti-G's, use centripetal force to exceed the yield point of the fluid and throw it through a screen where it is collected in the liquid ring (commonly known as the effluent ring). The solids are temporarily held in place by centripetal force while being conveyed downward using an auger/scraper, along the inner side of the screen until they fall off the conical screen, into an open bottom hopper. From there, they are conveyed from the Verti-G to temporary storage. A Verti-G can recover up to two thirds of the OBM from drill cuttings, leaving a stackable solids phase that is typically ready for transport to a landfill. Also like the ORU, the recovered oil from a Verti-G is very high in low gravity drilled solids and requiring substantial fluids rehabilitation. This is due to the Verti-G's use of an auger to scrape the cuttings off/downward of the screen which causes substantial partial degradation, thereby causing a significant increase in low micron solids passing through the narrow wedge-wire screen. Despite the Verti-G typically generating greater than 300 and less than 500 centripetal forces, which is sufficient to alter the fluid rheology and allow the liquids phase to leave the larger drill cuttings, the screen and scraper system is built such that both the liquids phase and solids phase of the slurry are encouraged to try and migrate the narrow passages of the wedge-wire screen. Given the yield point of the liquids phase is still high enough to carry solids, and given larger solids are further degraded into smaller pieces, not only do the low micron solids become mobile, these solids are actually pulled away from other larger solids they would otherwise be able to cling to. The fluidity of the liquids phase provides mobility to the micron sized solids, by carrying them through the wedge wire screen. It is important to note that Verti-G's do not like process upsets such as the feed consistency changing. When for example, the wetness, temperature, age or integrity of the liquid and solids phase changes, a Verti-G typically requires the operating parameters to be altered for the new feed consistency. Generally speaking, to operate a Verti-G with the desired outcome of a consistently drier solids phase, would be to the detriment of the liquids phase because operating the Verti-G with such a process metric would cause more LGS's to be carried with the recovered liquids phase. Thus, an advantage to the embodiment described herein is that while the liquids phase contains a greater amount of solids, the liquids phase also contains a greater amount of recoverable oil because only larger, drier solids are retained from passing through the screen.

Without limitation, a centripetal cuttings separator can include either an ORU, or Verti-G, or other apparatus which exerts similar gravitational forces upon unstabilized drilling waste with the desired outcome of a greater separation of liquids and solids phases. For the purposes of this embodiment, similar gravitational forces are significant forces, for example, greater than 300 and less than 3000.

Figure 3:
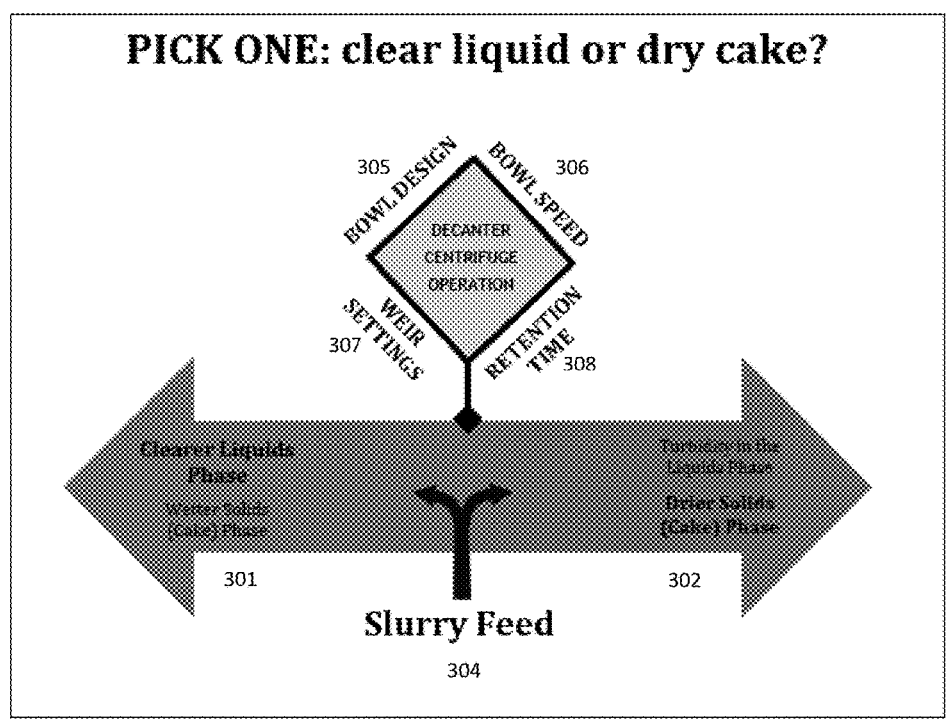
FIGS. 3 is an illustration of the variables of operating a horizontal decanter.

FIG. 3 is an illustration which demonstrates the liquids (301) and solids (302) underflow of a horizontal decanter centrifuge (303) in a conventional slurry (304) treating application. The figure provides an 'at a glance' look at how a conventional decanter centrifuge can be operated. Typically, an operator is trying to achieve a specific outcome of clearer liquids (301) or drier solids (302), by using the bowl design (305), bowl speed (306), weir settings (307), retention time (308) and hydraulic capacity (not shown) to their designed capacity. While the operating design of a centripetal cuttings separator is different than that of a horizontal decanter centrifuge, generally speaking any type of centripetal cuttings separator is faced with similar operational considerations as illustrated in FIG. 3.

In the case of a typical centripetal cuttings separator process, it would be common to add heat to at least the fluids rehabilitation portion of the process. The recovered liquids phase from the mechanical centripetal process would be heated and pumped to a conventional oilfield decanter dedicated to supporting the centripetal cuttings separator by removing the low gravity solids. An increased temperature in the polluted liquids phase provides an artificially lower viscosity of the liquids, thereby making the removal of low gravity solids easier than it would otherwise be at an ambient temperature of +30° C. or −30° C. Additionally, given the conventional oilfield decanter is only processing the recovcuttings separators can be used to achieve a combined 20 cubic meters per hour overall throughput (or more, or less, as required).

TABLE 1

| Mechanical Separation - Centripetal Cuttings Separator | |
|---|---|
| Typical average throughput of a Verti-G (consuming 250 kW's of electric energy) | Approximately 10 m$^3$ per hour (250 kW's/10 m$^3$ = approximately 25 kW's (per m$^3$ of feed) |
| Typical average throughput of an ORU (consuming 250 kW's of electric energy) | Approximately 5 m$^3$ per hour (250 kW's/5 m$^3$ = approximately 50 kW's (per m$^3$ of feed) |
| Design facility throughput | 20 m$^3$ per hour (using multiple Centripetal Separators) |
| Unstabilized Drill Cuttings Feed (stored within a common storage tank to allow for uniformity of the waste) | 1,000 volumetric liters of unstabilized drill cuttings (comprised of approximately 700 liters of drill cuttings and approximately 300 liters of OBM, per cube of unstabilized drill cuttings) |
| Post processing using Separators (Solids phase transported to disposition) | Approximately 500 liters of Solids Phase (comprised of approximately 450 liters of drill cuttings and approximately 50 liters of residual OBM) |
| Post processing using Separators (concentrated Liquids phase sent to fluids rehabilitation) | Approximately 500 liters of Concentrated Liquids phase (comprised of approximately 250 liters of OBM and approximately 250 liters of low gravity solids) |
| Post processing using a conventional decanter (Liquids phase sent to OBM reuse storage tank & LGS phase mixed with the bulk solids phase from the Separators prior to transport to disposition) | Approximately 150 liters of Liquids phase (recovered liquids phase consisting of approximately 140 liters of OBM and approximately 10 liters of low gravity solids). and, Approximately 350 liters of additional Solids phase (LGS's phase consisting of approximately 240 liters of solids and approximately 110 liters of residual OBM contamination) |
| Actual volume of OBM recovered (using 20 m$^3$ per hour of feed throughput on the mechanical treatment phase of the facility) | Approximately 3000 liters of OBM approximately 150 liters × 20 m$^3$ throughput = approximately 3,000 liters per hour (comprised of approximately 2,800 liters of OBM and approximately 200 liters of low gravity solids) |
| Actual volume of stabilized drill cuttings sent to landfill for final disposition (using 20 m$^3$ per hour of feed throughput on the mechanical treatment phase of the facility) | Approximately 17,000 liters of Drilling Waste (comprised of approximately 3,200 liters of OBM and approximately 9,000 liters of pre-dried drill cuttings and approximately 4,800 liters of low gravity solids, all mixed together as a uniform, self-stabilized mixture of "treated" drilling waste) |
| Energy input | 250 to 500 kW's/20 m$^3$ = 25 to 50 kW's (per m$^3$ of unstabilized drill cuttings) | ered liquids phase, the flow rate is subsequently lower than the hydrostatic capacity of a decanter centrifuge in a typical oilfield application. Thus, the liquids phase has an opportunity to spend more time in the bowl under the stresses of high gravity forces, providing a clearer liquids phase (recovered OBM). Despite the addition of heat energy or the opportunity to stress the recovered liquids phase for longer than a typical drilling/oilfield application, a residual low gravity solids value of 5% (by volume) is the best outcome an operator can reasonably expect from any horizontal decanter in this application.

Despite the operational limitations of an Oil Recovery Unit or Verti-G, centripetal cuttings separators are an economical first form of mechanical separation. Typically, one would expect the centripetal cuttings separator would require better than one third and less than two thirds of the total energy consumption, with the balance of energy consumption going to the supporting heating system (if equipped) and polishing decanter for liquids phase clarification.

Table 1 illustrates the typical power consumption and general operating metrics of employing a centripetal cuttings separator to recover oil base mud from drilling waste. Specifically, Table 1 illustrates estimated energy consumption of a single centripetal cuttings separator process of mechanical throughput (using a 5 to 10 cubic meters per hour throughput), including the supporting heating system and polishing decanter (the resulting energy consumption is approximately 30 to 60 kW's (kilowatts) per cubic meter of unstabilized drill cuttings processed). Parallel centripetal Another example of an oil recovery and solids washing technology is discussed in commonly owned U.S. Pat. No. 8,820,438, the disclosure of which is herein incorporated by reference, wherein a solvent washing process is employed to dissolve the oil on cuttings, by introducing the unstabilized drill cuttings into an inclined auger tank filled with solvent as the wash medium. The solids are caused to interact with the solvent by means of an auger stirring-while-conveying the solids phase up the wash tank within a counter-current flow of clean solvent. The internal mixing that occurs within the wash tank allows the diluent to dissolve the OBM while reducing (if not eliminating) the yield strength the OBM has on the drilled solids. After a residence time of approximately 20 minutes in the wash tank, the liquid is substantially separated from the drill cuttings and conveyed to a drying process wherein the solvent is recovered for reuse and the clean cuttings are ejected from the gas tight process. The solvent and liquid contain residual low gravity solids which are removed using a gas tight horizontal decanter which is capable of applying sufficient force to the liquids phase to remove the low gravity solids. This solids phase removed by the polishing decanter is also moved to a drying process for solvent recovery, while the solids free liquid phase is sent to a distillation column or flash kettles for solvent recovery. Air is purged and prevented from entering the process by a blanket gas system in combination with seals and fluid legs. Oxygen analyzers are used to ensure that oxygen concentration in the atmosphere is well below the explosive limit.

While the technology described in U.S. Pat. No. 8,820, 438 is a significant step forward in cleaning hydrocarbon contaminated drill cuttings, there is still room for improvement. For example, as OBM accumulates in the solvent, the viscosity of the resulting mixture increases, thereby giving the liquid phase a higher viscosity and greater ability to carry low gravity solids. This is similar to what happens during the drilling of the well, from where the drill cuttings originated (drill cuttings are carried up the wellbore by the viscosity of the OBM). As the ratio of solvent to OBM changes in the wash tank from more solvent to less solvent (solvent being displaced by the OBM), so does the volume of low gravity solids being carried in the liquids phase. Despite wetter drill cuttings representing an opportunity for more recoverable hydrocarbons such as oil, which is clearly better from an economic standpoint, wetter cuttings may mean the solvent wash process needs to operate at reduced rates to achieve a given level of separation performance.

Table 2 illustrates the energy consumption of a solvent wash process using a 10 cubic meter per hour throughput (the resulting energy consumption is 300 kW's per cubic meter of unstabilized drill cuttings processed).

the facility is ready to process the waste. Permitting the drilling waste to comingle within a common storage tank (415) for a short period of time allows naturally wetter drill cuttings (those containing a higher volume of OBM contamination) and naturally drier drill cuttings (those containing a lower volume of OBM contamination) to become a uniform mixture, prior to conveying the first phase into the process.

The uniformly consistent drilling waste is conveyed into the centripetal cuttings separator (417) by means of a conventional auger or augers (not shown), depending on positioning or elevations of various components of the process. In some cases, a positive displacement pump (not shown), for example, a progressive cavity pump can be used, but typically a pumping process causes more degradation of the drill cuttings, resulting in smaller drill cuttings pieces, which in turn means more surface area becomes available for adhesion of the free liquids on the drilling waste. Given there are generally two types of centripetal cuttings separa-

TABLE 2

Solvent Extraction Process

| | |
|---|---|
| Designed facility throughput (consuming 3,000 kW's of electric energy, or equivalent energy through a combination of electric and natural gas energy) | 10 m$^3$ per hour (3,000 kW's/10 m$^3$ = 300 kW's (per m$^3$ of feed) |
| Unstabilized Drill Cuttings Feed (stored within a common storage tank to allow for uniformity of the waste) | 1,000 volumetric liters of unstabilized drill cuttings (comprised of approximately 700 liters of drill cuttings and approximately 300 liters of OBM, per cube of unstabilized drill cuttings) |
| Post processing of the solvent wash (solids phase transported to disposition) | Approximately 700 liters of Solids Phase (comprised approximately 690 liters of drill cuttings and approximately 5-10 liters of residual OBM) |
| Post processing of the solvent wash (recovered OBM sent to storage for resale) | Approximately 300 liters of Liquids phase (comprised approximately 290 liters of OBM and approximately 5-10 liters of low gravity solids) |
| Actual volume of OBM recovered (using 20 m$^3$ per hour of feed throughput on the solvent wash phase of the facility) | Approximately 3000 liters of OBM approximately 300 liters × 10 m$^3$ throughput = approximately 3,000 liters per hour (comprised of 2900 liters of OBM and approximately 50-100 liters of low gravity solids) |
| Actual volume of stabilized drill cuttings sent to landfill for final disposition (using 10 m$^3$ per hour of feed throughput on the solvent wash phase of the facility) | Approximately 7,000 liters of Drilling Waste (comprised of approximately 50-100 liters of OBM and 6,900 liters of drill cuttings and low gravity solids phase, all mixed together as a uniform, self-stabilized mixture of treated drilling waste) |
| Energy input (per cube of recovered OBM portion of Liquids Phase) | 3,000 kW's/10 m$^3$ = 300 kW's (per m$^3$ of unstabilized drill cuttings) |

These problems and others in this area are addressed with the systems, methods and apparatus described herein. The system disclosed herein employs the use of centripetal cuttings separator(s) to separate the components of the first unstabilized drill cuttings phase into a second solids phase with a lower liquids content, and a third (concentrated) liquids phase with a high amount of solids, prior to employing a solvent wash to the third liquids phase. The whole embodiment is arranged as a centralized facility, as opposed to an on-site process, that effectively combines centripetal mechanical separation to harvest the majority of valuable (albeit polluted) hydrocarbons, and solvent extraction to clean the concentrated, polluted liquids phase, in an effort to give the centralized facility a higher throughput or lower the energy consumption cost, per cube of unstabilized drill cuttings waste.

Figure 4:
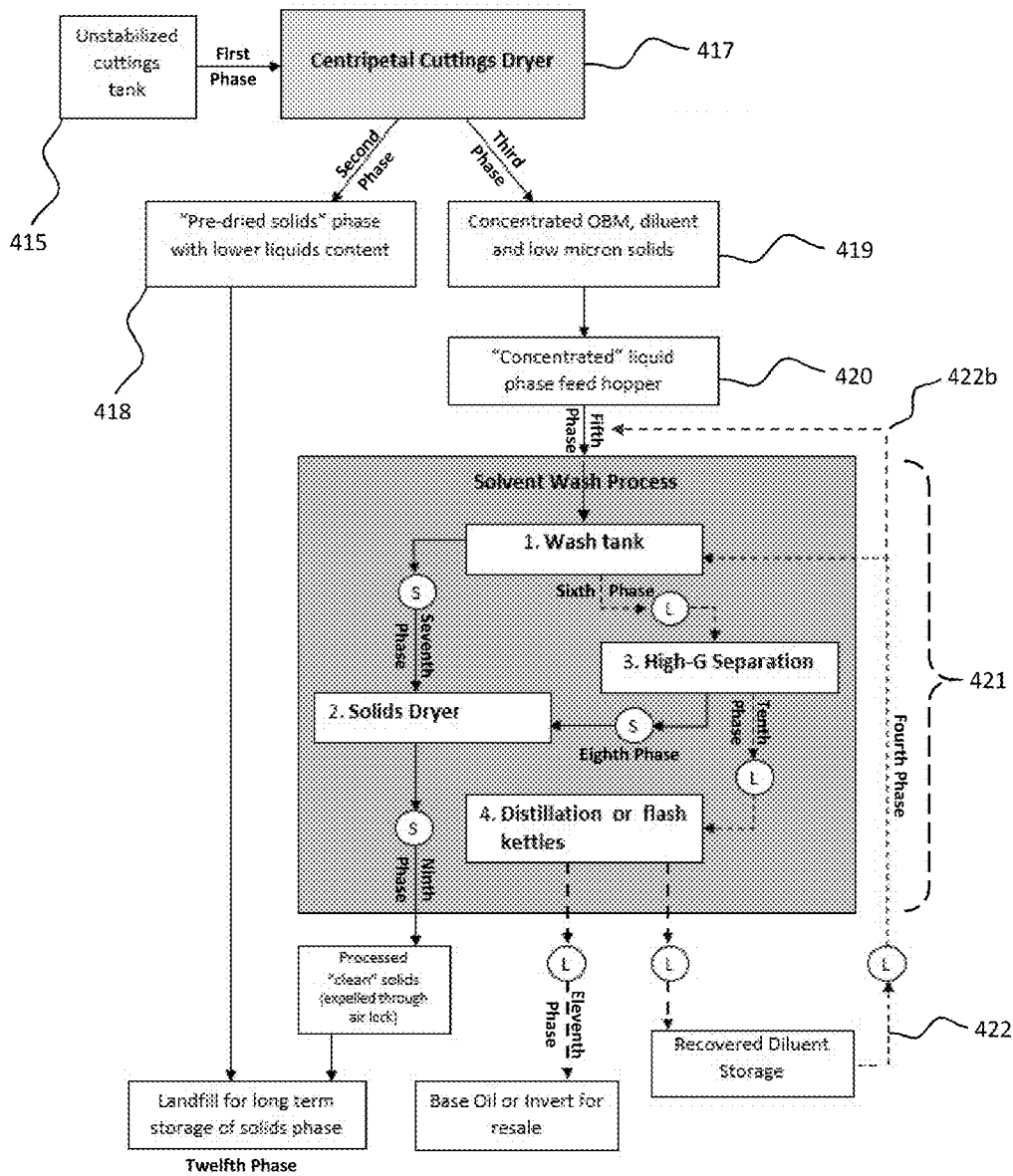
FIGS. 4 is a flow chart demonstrating a process layout useful with an embodiment described within.

FIG. 4 is a flow chart demonstrating the typical movement of the phases through the hybrid mechanical and solvent wash process.

The drilling waste (consisting of a mixture of oil base drilling fluid and drill cuttings) is received and stored until tors (417), and many sizes and models thereafter, suffice it to say, a commercially available centripetal cuttings drying technology would be employed as the first separation mechanism.

As demonstrated by FIG. 4, the centripetal cuttings separator is to be fed a first phase of unstabilized drill cuttings and operated such that the resulting output results in two distinctly different phase characteristics:
1) a second solids phase (418)—drier solids because of lower fluids concentrations. While the second solids phase is considered self-stabilized and no longer in need of further treatment or the addition of stabilization material (such as sawdust, fly ash or liquid absorbing pellets), it still contains approximately 10% hydrocarbons (by volume). and,
2) a third liquids phase (419)—comprising nearly equal volumes of low micron sized solids and OBM. While the outcome of producing a viscous, concentrated slurry of solids and OBM it typically not desired by any operator, it will prove to be advantageous in the description that follows.

As noted throughout this description, the operation of a centripetal cuttings separator with the desired outcome of a maximum liquids removal from the second solids phase will result in high volumes of low micron solids being carried with the third liquids phase. This is in part due to degradation of the solids phase by the mechanical nature of a centripetal cuttings separator but also, centripetal cuttings separators have a difficult if not impossible time removing low micron solids from OBM because the low micron solids have the ability to pass through the process and be carried with the third liquids phase. Conventional oilfield decanters would typically be employed to remove the low micron solids, but given the viscosity of the third liquids phase, such efforts are typically futile at best. While this is a drawback of using a centripetal cuttings separator of any design, it is actually an advantage to the embodiment of the hybrid process described within. The centripetal cuttings separator will have the ability to remove a substantial portion of the OBM from larger drill cuttings pieces while actually permitting the low micron solids with more surface area to continue onto the next phase of treatment, which is capable of treating lower micron solids and thereby recovering OBM that would otherwise be lost to centripetal forms of OBM recovery alone.

The third liquids phase is a "concentrated mixture" of low micron sized solids and OBM and in need of further treatment, which is facilitated by using a solvent wash process.

Figure 5A:
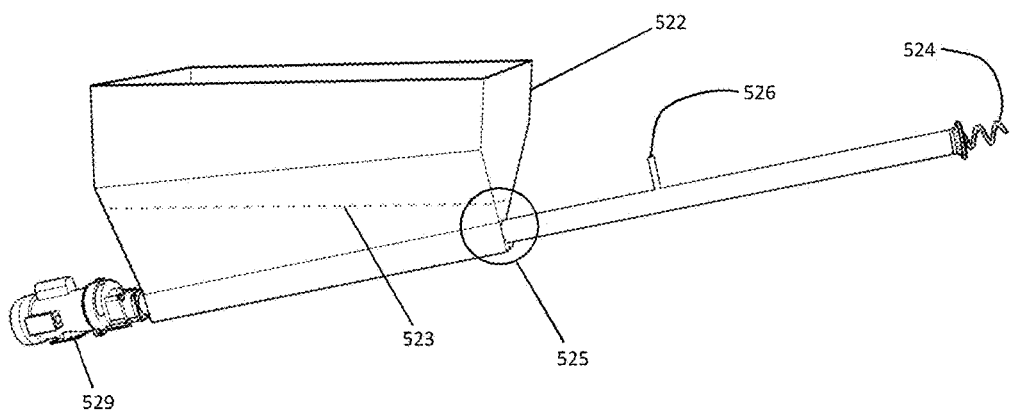
FIGS. 5a and 5b depict exemplary layouts for a hopper system as described herein capable of maintaining a plug which prohibits the entry of atmosphere containing oxygen to the process, or the escape of volatiles from the process to the atmosphere.
Figure 5B:
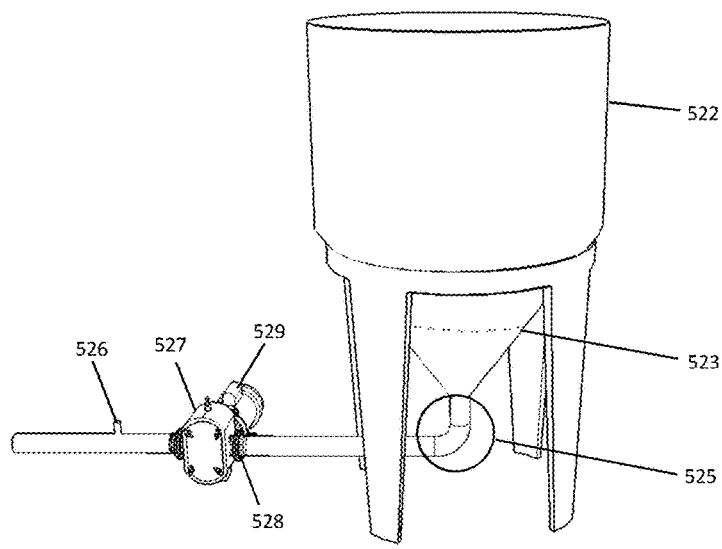

FIGS. 5a & 5b are illustrations of hoppers capable of maintaining a gas tight barrier. Once the waste has been processed by the centripetal cuttings separator (417), the third liquids phase (419) is conveyed or discharged directly into a hopper (522) which maintains a minimum volume (523) over the outlet. FIGS. 5a and 5b illustrate in more detail how a hopper outlet (525) is designed to prohibit entry of unwanted air to the process, or the escape of a volatile diluent to the atmosphere. The safe minimum level of third liquids phase (523) in a hopper tank can be controlled either by means of a weight indicator on the hopper (not shown) or overhead level transducer (not shown), or by operator observation. The process feed rate is controlled by a feed auger (524) or flange connected (528) feed pump (527), which allows conveyance of the third liquids phase to occur at a controlled and measured rate, also known as 'characterization of flow'. If in the case of a feed pump (527), a positive displacement pump can be used to facilitate conveyance and simultaneous further mixing of the third liquids phase and diluent. The use of a positive displacement pump is practical at this point because the pumping action of a fluidic slurry is unlikely to cause further degradation of the solids. The auger or pump is powered by an electric or hydraulic motor, the preferred method being an electric motor (529) because a variable frequency drive (not shown) is easily adjusted to slow or increase the conveyance rate. Either an auger (524) or positive displacement pump (527) results in the safe and accurate conveyance of the third phase (419) into a diluent wash process (421), while maintaining a gas tight barrier (525) between the hopper tank (522) and the diluent wash equipment (421).

Figure 6A:
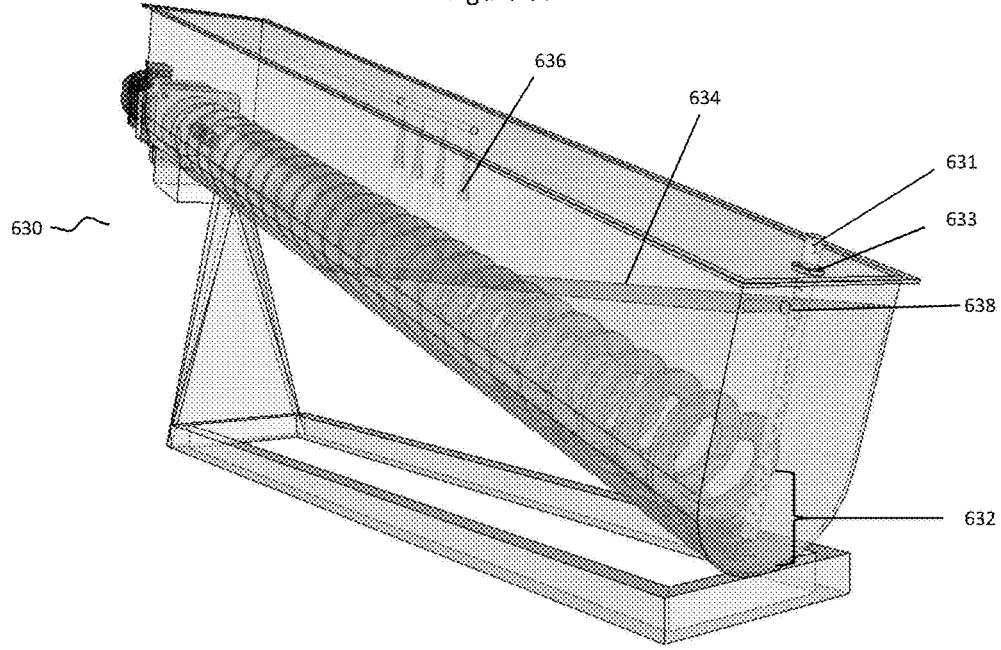
FIGS. 6a and 6b depict an exemplary layout of a solvent filled wash tank described herein useful for removing recoverable oil from solids.
Figure 6B:
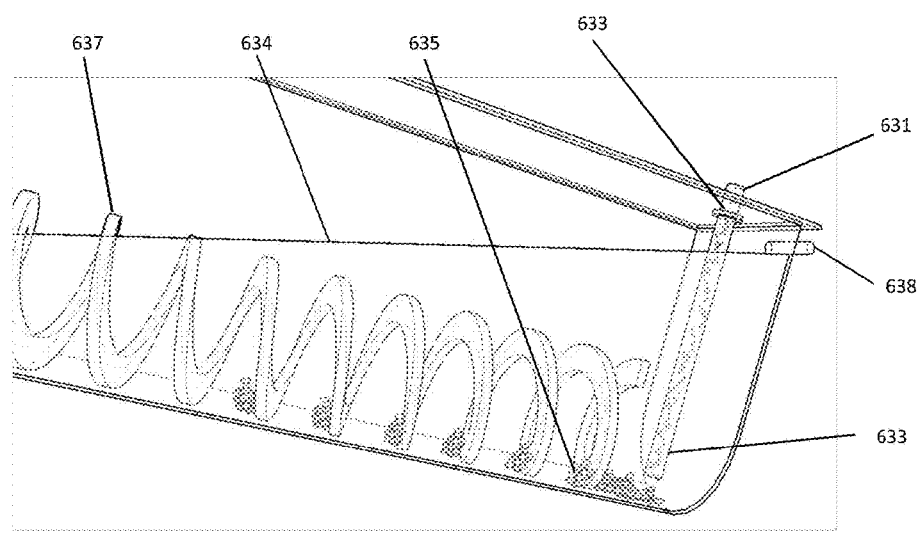

FIG. 6 is an illustration of a solvent wash tank with lower feed injection.

The fourth liquid phase (422b), being a diluent suited for drill cuttings washing, is added to the concentrated third liquids phase (419) via an injection port (526), to allow the less viscous fourth diluent (422b) to mix with the concentrated third liquids phase (419) creating a fifth liquids phase. The OBM in the concentrated fifth liquid phase feed will have a lower yield point, (or elimination of the yield strength entirely) and lower viscosity as the diluent (422) dilutes the OBM portion of the third phase. The end result being that the OBM has a lower adhesion to the low micron solids within the concentrated third liquid phase.

Ideally, the fifth liquid phase, consisting of a mixture of the third liquids phase and fourth diluent, is pumped or conveyed to the solvent wash tank (630) and injected (631) in a location which causes the low micron solids of the third phase to enter the wash tank nearer the lower section (632) of the wash tank. The addition of solvent to create the fifth liquids phase extends the interaction of the third liquids phase and fourth diluent phase, thereby allowing additional mixing/scrubbing of the two in a controlled environment where LGS's suspension is productive (in a pipe, conduit or hose) versus counter-productive (in the solvent filled wash tank). This can be accomplished through either:

1. a lower injection port which enters through the side or end of the wash tank (not shown) or,
2. via an inlet which enters a gas tight duct (633) nearer the top section of the wash tank (630) and extends into the liquid (634) of the solvent wash tank, to the lower part of the solvent wash tank (632).

Either injection method would work and one isn't known to be better than the other suffice it to say, the injection feed component must maintain the gas tight barrier (633) of the solvent wash process (421).

Optionally, (given the solvent wash tank (630) is prefilled with solvent (634)), the third liquids phase could be pumped or conveyed to the solvent wash tank without the prior addition of the fourth diluent (422b) to create a fifth liquids phase, and injected in a location which causes the low gravity solids (635) of the third phase to enter the wash tank nearer the lower section (632) of the wash tank. Diluent (422) would then be added to the wash tank via a port (636) which is located nearer the top half of the wash tank, to continue or maintain the ratio of the third liquids phase.

As previously mentioned, the solvent (634) filled wash tank (630) is working within a single gravitational force and therefore, given the necessary 'stirring while conveying' nature of the wash tank, low gravity solids have a propensity to become agitated by the auger (637) and remain suspended in the single gravity force environment. U.S. Pat. No. 8,820,438 describes a process wherein the whole volume of unstabilized drill cuttings are conveyed to the wash process so that the solids phase, consisting of larger drill cuttings pieces, intermixed low gravity solids and OBM, enter the wash tank from the top therefore causing additional agitation within the wash tank, caused by the unstabilized drill cuttings mixture splashing into the wash tank and overcoming the settling velocity of the low gravity solids phase.

The embodiments described herein have many advantages over that of past processes (for example, U.S. Pat. No. 8,820,438) including:

a concentrated third phase feed represents a consistently higher volume of OBM being fed to the solvent wash process which is advantageous from an economic standpoint, because there is a higher volume of OBM available for recovery. and, a substantially lessor volume of solids phase requiring treatment in the solvent wash process and dryer. and, a highly fluidic fifth phase of diluent and concentrated low gravity solids and OBM, which can be pumped to the lower section of the solvent wash tank, thereby eliminating "splashing" that occurs in prior processes (e.g., commonly owned U.S. Pat. No. 8,820,438). and, a lower volume of solids phase within the overall third phase resulting in substantially less solids on each flight of the wash tank conveyor, allowing:

the wash tank conveyor to be rotated at a slower rate (thereby reducing the agitation of 'stirring while conveying' operational concern) and/or, the lower solids phase content on each flight represents a greater surface area for the low gravity solids being conveyed by each flight of the solvent wash tank.

any or all of these being especially advantageous.

Despite the single gravitational force, the hybrid process will provide a (seemingly) static nature in the solvent wash tank so that the low gravity solids can remain relatively undisturbed and capable of settling at a predictable rate. The rate of diluent additions should be sufficient to significantly reduce the yield point and to reduce the (plastic) viscosity of the third liquids phase. The volume of diluent added to the third liquids phase would be approximately 1:1, with a minimum ratio being 1:5, and a maximum ratio being 5:1. The "ideal ratio" of diluent to concentrated third liquids phase could be influenced by capital cost of the equipment, operating costs for the facility, and throughput versus maximizing drilling fluid recovery.

Table 3 illustrates yield point (represented in Pascals, Pa.) and plastic viscosity (represented in Centipoise, cP) of an oil base drilling fluid, or mixture of diluent and the oil base liquids phase of unstabilized drill cuttings, at various ratios. For the purposes of obtaining data for Table 3, actual test results were used in the 1260 kg/m$^3$ fluid while estimates (represented by the shaded areas) are used for the 1800 kg/m$^3$ fluid. Where applicable, hexane was used as the diluent and a concentrated third liquids phase with a density of 1800 kg/m$^3$ was comprised of an estimated 50% (by volume) OBM liquids phase and 50% (by volume) solids.

TABLE 3

| Ratio of diluent to concentrated OBM feed (density is expressed in parentheses) | Temperature | Plastic Viscosity (cP) | Yield Point (Pa) |
| --- | --- | --- | --- |
| (670) 0:1 (1260) | 50° C. | 25 | 4.5 |
| (670) 0:1 (1260) | 0° C. | 89 | 12 |
| (670) 0:1 (1800) | 50° C. | Greater than 25 | 3 to 8 |
| (670) 0:1 (1800) | 0° C. | Greater than 89 | Greater than 12 |
| (670) 1:1 (1800) | 0° C. | Less than 5 | Less than 1 |

It is important to note, while additional fluids rehabilitation is required even with the hybrid technology, this is a particularly opportune time to address the fluids rehabilitation issue. The diluent is chosen for its ability to dissolve in OBM, while reducing the viscosity and yield strength of the OBM. Given the yield point and plastic viscosity of the OBM have been substantially reduced (if not eliminated altogether) by the addition of the diluent (636), LGS's carried out of the solvent wash tank overflow outlet (638) are sent to the clarification equipment which is facilitated by means of a gas tight liquids polishing decanter (for example, see copending, commonly owned US Patent Application No. 62/212,754, the disclosure of which is herein incorporated by reference), or settling tanks, for example, inclined plate clarifiers.

As previously described, diluent additions can be facilitated by injecting the diluent between the hopper and the solvent wash apparatus, or nearer the top section of the wash tank, or a combination of both, as determined by the operator of the facility. The location of the diluent additions is of less concern, provided the outcome results in the liquid phase occupying the solvent wash tank having a plastic viscosity value of less than 5 cP and a yield point of less than 1.0 Pa.

Once the low gravity solids have been removed from the sixth liquid phase (to a level satisfactory to the needs of the whole process), the tenth liquids phase consisting of diluent, oil and less than 1% (by volume) low gravity solids is sent to flash kettles, or distillation equipment for diluent recovery (note that in FIG. 4, S indicates a substantially solids phase (measurably greater solids than liquids) and L indicates a substantially liquids phase (measurably greater liquids than solids) moving through the process).

The hybrid facility process results in a proportionately lower overall volume being processed by the solvent wash process (421), which also results in a lower volume of the seventh and eighth solids phase being sent to a solids drying process to remove the residual solvent for reuse, which represents a further reduction in energy consumption. The combined seventh and eighth solids phase is ejected from the solvent wash equipment by means of a mechanical air lock, as a combined ninth phase, which is added to the second phase to create a twelfth phase, requiring transport (or conveyance) to a landfill cell for final disposition.

The hybrid mechanical and solvent wash process results in at least four key advantages over using only one or the other technology individually:

1) Operational advantage—either a Centripetal Separation Facility or Solvent Washing Facility will require approximately 3 operators (scale operator, equipment operator and computer operator, for example) be present at all times. The hybrid facility is expected to need approximately 4 operators (scale operator, two equipment operators and a computer operator, for example) which offers a better utilization of the operators on duty, given the increase in separation performance, and ultimately the increase in value of saleable product.

2) Energy efficiency—given the solvent washing process is likely to be the cost or processing speed bottleneck, the hybrid facility provides an energy savings advantage, which is demonstrated in Table 4. Table 4 illustrates typical power consumption and general operating metrics of a hybrid facility which employs both a mechanical process and washing process to recover oil base mud from drilling waste. Table 4 shows that a centralized hybrid waste treatment facility which is capable of processing approximately 20 volumetric cubic meters of unstabilized OBM contaminated drill cuttings per hour by means of centripetal cuttings separator (s) can provide 10 volumetric cubic meters of concentrated feed stock for the solvent washing process, which is the more energy intensive process in the hybrid facility.

3) Environmentally advantageous—given a centripetal cuttings separator uses mechanical separation, the best outcome of this technology is an approximately 65% (by volume) reduction in hydrocarbon contamination for an energy investment of 25 to 50 kW's per cubic meter. These solids have a strong odor of hydrocarbons and are visually unimpressive. a solvent wash process typically achieves a 97% (by volume) reduction in hydrocarbons as well as removal of residual water, by investing 300 kW's per cubic meter. This solids phase has virtually no odor and is very dry, presenting a visually appealing clean material. The hybrid facility is expected to recover greater than 80% (by volume) of the OBM and while cleaned drill cuttings reuse is jurisdictionally dependent on local regulatory guidelines, the twelfth phase mixture of the more contaminated second phase cuttings and less contaminated ninth phase cuttings, there is still a strong argument for an environmental benefit to reuse the cleaned drilling waste.

TABLE 4

HYBRID COMMERCIAL TREATMENT FACILITY

| | |
|---|---|
| Unstabilized Drill Cuttings Feed (stored within a common storage tank to allow for uniformity of the waste) | 1000 volumetric liters of unstabilized drill cuttings (comprised of approximately 700 liters of drill cuttings and approximately 300 liters of OBM, per cube of unstabilized drill cuttings) |
| Throughput (based on a centralized commercial treatment facility) | 20 m$^3$ per hour (using one or more centripetal cuttings separators to achieve approximately 10 m$^3$ liquid phase recovery per hour) |

Centripetal Cuttings Separators (s)

| | |
|---|---|
| Post processing (Solids phase transported to disposition) | 500 liters of Solids Phase (comprised approximately 450 liters of solids and approximately 50 liters of OBM) |
| Post processing (concentrated Liquids phase sent to solvent extraction in lieu of fluids rehabilitation) | Approximately 500 liters of Liquids phase (comprised approximately 250 liters of OBM and approximately 250 liters of low gravity solids) |

Solvent Extraction Process

| | |
|---|---|
| Pre processing (10 m$^3$ of concentrated liquids phase feed from the centripetal cuttings separators) | Approximately 500 liters of Liquids phase (comprised approximately 250 liters of OBM and approximately 250 liters of low gravity solids) |
| Post processing using the solvent wash equipment (Liquids phase sent to OBM reuse storage tank & LGS phase mixed with the bulk solids phase from the Separators prior to transport to disposition) | Approximately 250 liters of Liquids phase (comprised approximately 240 liters of OBM and approximately 5-10 liters of LGS's) Approximately 250 liters of Solids phase (comprised approximately 240 liters of LGS's and approximately 5-10 liters of OBM) |
| Actual volume of OBM recovered (using 10 m$^3$ per hour of feed throughput on the solvent wash phase of the facility) | Approximately 5000 liters of OBM approximately 250 liters × 20 m$^3$ front throughput = approximately 5,000 liters per hour (comprised of 4,800 liters of OBM and approximately 200 liters of LGS's) |
| Actual volume of stabilized drill cuttings sent to landfill for final disposition (combined solids from both the centripetal separation and solvent washing of the facility) | Approximately 15,000 liters of Drilling Waste (comprised of approximately 1,200 liters of OBM and 13,800 liters of drill cuttings and low gravity solids phase, all mixed together as a uniform, self-stabilized mixture of treated drilling waste) |

Energy Input

| | |
|---|---|
| Centripetal Cuttings Separators | less than 25-50 kW's per cube of feed (less than 750 kW's total) |
| Solvent Extraction Process | less than 300 kW's per cube of feed (less than 3000 kW's total) |
| Total | less than 3,750 kW's/20 m$^3$ feed stock = less than 190 kW's (per m$^3$ of unstabilized drill cuttings) |

4) Economic benefit—the capital cost of a facility utilizing only centripetal separator would be significant while offering poor overall separation. The capital cost of a facility utilizing a solvent wash process is projected to be three and a half times greater than a centripetal separator facility, yet it would recover substantially all of the residual hydrocarbon contaminants. The hybrid facility is only estimated to cost four times that of the centripetal separator facility due to the facility not needing duplicate receiving tanks, OBM storage tanks, process heaters, earthworks, etc. Most importantly, the hybrid facility will create a concentrated feed stock for the solvent wash process, permitting an overall higher oil recovery utilization of the more expensive components of the facility. The benefits are further illustrated below in Table 5:

TABLE 5

| | Centripetal Separation | Solvent Washing | Hybrid Process |
|---|---|---|---|
| Energy required per cubic meter of unstabilized drill cuttings | approximately 25 kW's | approximately 300 kW's | approximately 188 kW's |
| Actual OBM liquids phase received at the facility in the[NOTE 1] | 432,000 m$^3$ | 216,000 m$^3$ | 432,000 m$^3$ |
| Estimated Cubes of OBM recovered over the lifetime of the facility[NOTE 2] | 216,000 m$^3$ | 208,800 m$^3$ | 349,200 m3 |
| OBM lost during the treatment process | 216,000 m$^3$ | 7,200 m$^3$ | 82,800 m3 |
| Facility recovery effectiveness | approximately 50% | approximately 97% | approximately 81% |
| Estimated number of personnel required | approximately 3 people | approximately 3 people | approximately 4 people |
| Estimated Capital Cost of a facility | approximately $4M[NOTE 4] | approximately $14M | approximately $16M |
| Retail value of the recovered OBM[NOTE 3] | $108M | $104.4M | $174.6M |

NOTE 1 Based on drill cuttings received with a "wetness" of 30% OBM (by volume) × the facility rated throughput (per hour) × 24 hours/day × 300 productive days per year × 10 year useful facility life
NOTE 2 Based on a cuttings "wetness" of 30% (by volume) × the facility rated throughput (per hour) × 24 hours/day × 300 productive days per year × 10 year useful facility life × % OBM recovery × the effectiveness of the recovering technology
NOTE 3 The retail value of the recovered OBM is based on a resale rate of $500 per cubic meter (1000 liters) and the 'Centripetal Separation' facility suffers no loss in OBM value at a retail level, despite having greater than or equal to 5% (by volume) LGS's in the recovered OBM
NOTE 4 References to dollar amounts are shown as "M" meaning, millions of dollars The methods and systems described herein meet the challenges described above, including, among other things, achieving more efficient and effective drilling waste processing. The scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for treating unstabilized drill cuttings comprising,
    separating a first phase of unstabilized drill cuttings into a second phase of drill cuttings containing less liquid than the first phase and a concentrated third liquid phase,
    wherein the second phase comprises self-stabilized drill cuttings, and is disposable without addition of stabilization material, and
    the concentrated third liquid phase has a rheology and comprises a concentrated mixture of oil based drilling mud containing solids, wherein the solids comprise low micron solids with a size less than fifty microns that include high gravity solids with a specific gravity above 3.0 and low gravity solids with a specific gravity below 3.0 , and wherein the concentrated third liquid phase contains approximately equal volumes of the oil based drilling mud and the solids and,
    altering the rheology of the concentrated third liquid phase by flowing the concentrated third liquid phase concentrated mixture of oil based drilling mud and solids through a gas tight solvent wash to remove the oil based drilling mud from the concentrated third liquids-phase,
    resulting in increased overall throughput of unstabilized drill cuttings through the process without an increase in overall power consumption or capital investment.

2. The process of claim 1 wherein the process consistently produces a second phase of drill cuttings containing less liquid than the first phase.

3. The process of claim 2 wherein a vertical centripetal cuttings separator is used to separate the first phase of unstabilized drill cuttings.

4. The process of claim 3 wherein the vertical centripetal cuttings separator is operated at greater than 300 times the Earth's gravitational force.

5. The process of claim 3 wherein the vertical centripetal cuttings. separator is operated at greater than 400 times the Earth's gravitational force.

6. The process of claim 2 wherein an oilfield decanter specifically adapted for treating oil base mud drill cuttings is used to separate the first phase of unstabilized drill cuttings.

7. The process of claim 6 wherein the oilfield decanter is operated at greater than 1000 times the Earth's gravitational force.

8. The process of claim 1 wherein the concentrated third liquid phase is held in a gas tight feed hopper before the solvent wash.

9. The process of claim 1 wherein the first phase of unstabilized drill cuttings originates from multiple sources which are comingled prior to the step of separating.

10. The process of claim 1 wherein the solvent wash has an upper section and a lower section and the concentrated third liquid phase is introduced into the lower section of the solvent wash using positive pressure to facilitate the solids overcoming the Earth's gravitational force in the wash to become fully dispersed in the oil based mud and solvent wash.

11. The process of claim 10 wherein the concentrated third liquid phase is conveyed to the solvent wash so as to maintain a solvent to oil based mud ratio within the solvent wash to produce a liquids phase yield point of less than 1 Pa.

12. The process of claim 10 wherein the concentrated third liquid phase is flowed through the solvent wash at a rate so as to maintain a solvent to oil based mud ratio within the solvent to produce a plastic viscosity of less than 5 cP.

13. The process of claim 1 wherein the solvent wash contains at least one diluent having a flashpoint less than or equal to 37° C.

14. The process of claim 1 wherein a mixture of the concentrated third liquid phase concentrated mixture of oil based drilling mud containing solids and solvent in the solvent wash has a flashpoint less than or equal to 37° C.

15. The process of claim 1 wherein an additional solids phase is produced in the solvent wash which is removed from the solvent wash and conveyed to a solids dryer.

16. The process of claim 1 wherein the solvent wash contains at least one diluent having a vapor pressure equal to or greater than 0.1 Torr and less than 750 Torr, at 20° C.

17. The process of claim 1 wherein the gas tight solvent wash additionally contains less oxygen than required for ignition of the solvent wash.

18. The process of claim 1 wherein the gas tight solvent wash additionally contains an inert gas atmosphere.

19. The process of claim 18 wherein the inert gas atmosphere comprises one or more of nitrogen, carbon dioxide, or fuel gas.

20. The process of claim 18 wherein the inert gas atmosphere exerts a positive pressure in the process.

21. The process of claim 1 wherein the process consumes less than 200 kW's of electric or equivalent energy per cubic meter of unstabilized drill cuttings treated.

22. Apparatus for treating unstabilized drill cuttings comprising,
    a separator for separating a first phase of unstabilized drill cuttings into
    a second phase of drill cuttings containing less liquid than the first phase and a concentrated third liquid phase,
    wherein the second phase comprises self-stabilized drill cuttings and is disposable without addition of stabilization material, and
    the concentrated third liquid phase has a rheology and comprises a concentrated mixture of oil based drilling mud containing solids, wherein the solids comprise low micron solids with a size less than fifty microns that include high gravity solids with a specific gravity above 3.0 and low gravity solids with a specific gravity below 3.0, and wherein the concentrated third liquid phase contains approximately equal volumes of the oil based drilling mud and the solids and,
    a gas tight solvent wash tank in fluid flow communication with the separator for altering the rheology of the concentrated third liquid phase by flowing the concentrated third liquid phase concentrated mixture of oil based drilling mud and solids through the gas tight solvent wash tank to remove the oil based drilling mud from the concentrated third liquids phase,
    resulting in increased overall throughput of unstabilized drill cuttings through the apparatus without an increase in overall power consumption or capital investment.

23. The apparatus of claim 22 wherein the apparatus consistently produces a second phase of drill cuttings containing less liquid than the first phase.

24. The apparatus of claim 23 wherein the separator is a vertical centripetal cuttings separator.

25. The apparatus of claim 24 wherein the vertical centripetal cuttings separator operates at greater than 300 times the Earth's gravitational force.

26. The apparatus of claim 24 wherein the vertical centripetal cuttings separator is operated at greater than 500 times the Earth's gravitational force.

27. The apparatus of claim 23 wherein the separator is an oilfield decanter specifically adapted for processing unstabilized oil base mud drill cuttings.

28. The apparatus of claim 27 wherein the oilfield decanter operates at greater than 1000 times the Earth's gravitational force.

29. The apparatus of claim 22 including a gas tight feed hopper in fluid flow communication with the separator for further processing the concentrated third liquid phase.

30. The apparatus of claim 22 wherein the solvent wash tank has an upper section and a lower section and the concentrated third liquid phase is introduced into the lower section of the solvent wash using positive pressure to facilitate the solids overcoming the Earth's gravitational force in the wash to become fully dispersed in the oil based mud and solvent wash.

31. The apparatus of claim 22 including a conveyor and solids dryer in fluid flow communication with the solvent wash tank wherein an additional solids phase is separated in the solvent wash tank and is removed from the solvent wash tank and conveyed to the solids dryer.

32. The apparatus of claim 22 wherein the solvent wash tank contains at least one diluent having a vapor pressure equal to or greater than 0.1 Torr and less than 750 Torr, at 20° C.

33. The apparatus of claim 22 wherein the gas tight solvent wash tank is designed to contain less oxygen than required for ignition of the solvent wash.

34. The apparatus of claim 22 wherein the gas tight solvent wash tank is designed to additionally contain an inert gas atmosphere.

35. The apparatus of claim 34 wherein the inert gas atmosphere exerts a positive pressure in the apparatus.

36. The apparatus of claim 22 wherein the apparatus consumes less than 200 kW's of electric or equivalent energy per cubic meter of unstabilized drill cuttings treated.

* * * * *